UNITED STATES PATENT OFFICE.

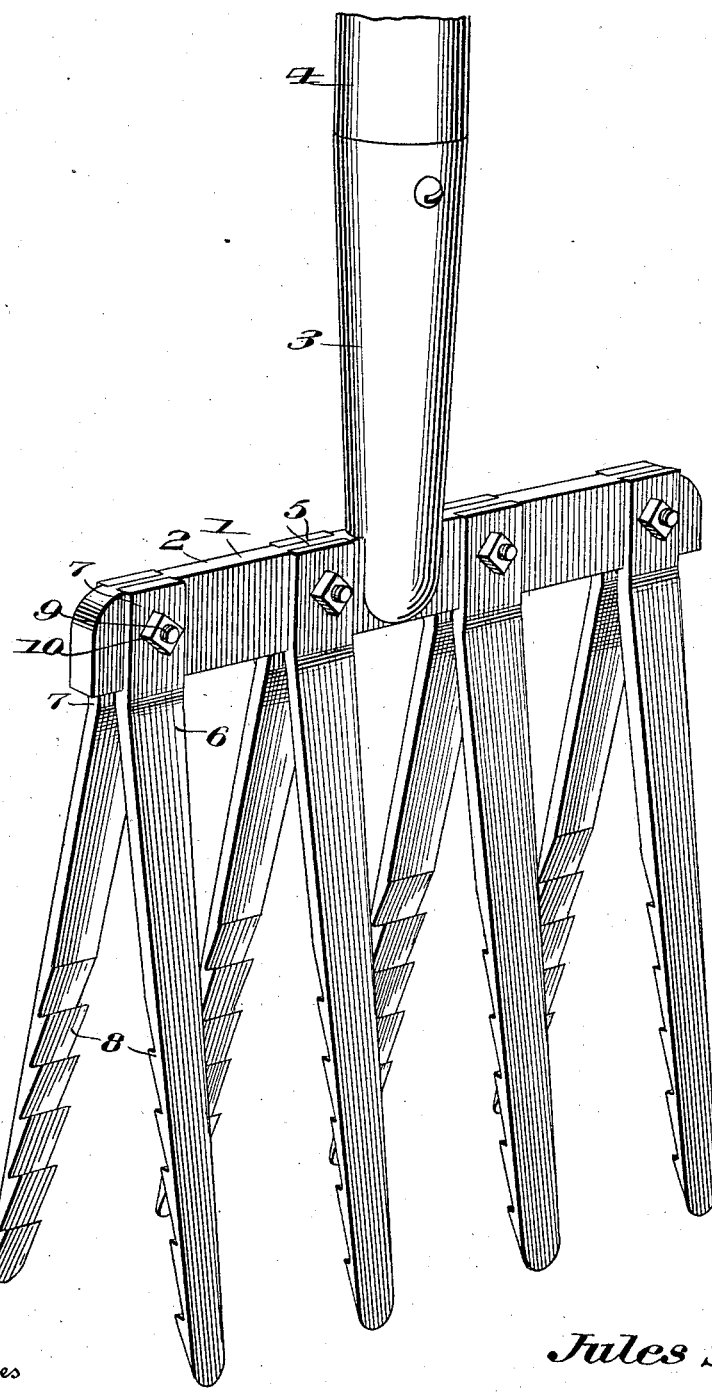

JULES SCHOOS, OF NEW BEDFORD, MASSACHUSETTS.

CLAM-DIGGER.

1,074,532.  Specification of Letters Patent.  Patented Sept. 30, 1913.

Application filed April 2, 1913. Serial No. 758,450.

*To all whom it may concern:*

Be it known that I, JULES SCHOOS, a citizen of the United States, residing at New Bedford, in the county of Bristol and State of Massachusetts, have invented new and useful Improvements in Clam-Diggers, of which the following is a specification.

The invention relates to an improved clam digger designed particularly for readily and quickly removing the clams from the sand in which they are embedded.

The main object of the present invention is the provision of a clam digger including a series of spaced downwardly divergent fingers formed on their relatively inner surface with gripping teeth, between which fingers the clam is gripped in the operation of the device and drawn upward with the digger.

The invention in its preferred form of details will be described in the following specification, reference being had particularly to the accompanying drawing, which represents a perspective view of the improved digger.

Referring particularly to the accompanying drawing, the improved clam digger comprises a head 1 including a bar 2 from which centrally projects a socket 3 of any usual or preferred type for the reception of the handle rod or shank 4. The opposite surfaces of the bar 2 are formed with transversely alined recesses or notches 5 extending entirely across the respective faces of the bar and of a depth to receive the fingers 6. These fingers are duplicates and through the described arrangement of the notches are disposed in pairs lengthwise the bar. Each finger extends downwardly from the bar in spaced parallel relation to the opposing finger for a short distance as at 7, the respective fingers of each pair being then projected on angularly related lines so that each pair of fingers gradually diverge toward their free or lower ends. The relatively inner surfaces of each finger for a portion of its length from the lower end upward is formed with a series of teeth 8 extending wholly across the finger and having their narrowest or reduced portions at their lower ends, thereby the teeth are disposed for upward lifting, as will be evident. Bolts 9 secured by nuts 10 are passed through openings in the bar and through registering openings in the fingers, whereby to secure the fingers in rigid relation to the bar at their points of connection.

The use of the improved clam digger will be obvious from the above description, it being obvious that the clams will be forced between the divergent ends of the fingers, which of course are necessarily somewhat resilient, and gripped by the teeth so that upon upward movement of the digger the clam or clams so picked up will be carried with the digger.

The parts are preferably of metal except the handle 4, though it is to be understood that I contemplate the use of any material and the construction of the device in any appropriate size.

What is claimed is:—

1. A clam digger including a bar, a series of fingers connected to the bar and arranged in pairs, the fingers of each pair diverging from the bar and throughout their full lengths.

2. A clam digger including a bar, a series of fingers connected to the bar and arranged in pairs, the fingers of each pair diverging from the bar and throughout their full lengths, the relatively inner surfaces of the fingers being formed with teeth.

3. A clam digger including a bar, a handle socket projecting therefrom, said bar being formed with opposing alined recesses and fingers removably secured in said recesses and depending below the bar, said fingers being arranged in pairs with the fingers of each pair projected below the bar on divergent lines.

In testimony whereof I affix my signature in presence of two witnesses.

JULES SCHOOS.

Witnesses:
CHARLES A. BLANCHETT,
HENRY REMY.

Copies of this patent may be obtained for five cents each, by addressing the "Commissioner of Patents, Washington, D. C."